United States Patent [19]

Wilkinson

[11] Patent Number: 5,126,835
[45] Date of Patent: Jun. 30, 1992

[54] METHOD AND APPARATUS FOR VIDEO SIGNAL DROPOUT COMPENSATION

[75] Inventor: James Hedley Wilkinson, Tadley, England

[73] Assignee: Sony Broadcast & Communications Limited, Basingstoke, England

[21] Appl. No.: 694,236

[22] Filed: May 1, 1991

[30] Foreign Application Priority Data

Jun. 13, 1990 [GB] United Kingdom ............... 9013189

[51] Int. Cl.⁵ .................. H04N 11/10; H04N 9/88
[52] U.S. Cl. .................................. 358/36; 358/16; 358/314
[58] Field of Search ............ 358/314, 163, 16, 14, 358/21 R, 36

[56] References Cited

U.S. PATENT DOCUMENTS

| | | | |
|---|---|---|---|
| 3,843,457 | 6/1989 | Yamagata | 358/314 |
| 4,122,489 | 10/1983 | Bolger et al. | 358/314 |
| 4,250,521 | 2/1981 | Wright | 358/21 R |
| 4,329,708 | 5/1987 | Yamamoto et al. | 358/36 |
| 4,368,483 | 1/1983 | Liu | 358/36 |
| 4,464,474 | 8/1984 | Schulz et al. | 358/314 |
| 4,490,748 | 12/1984 | Kamath | 358/21 R |
| 4,517,600 | 5/1985 | Reitmeier | 358/166 |
| 4,630,131 | 12/1986 | Ichinoi et al. | 358/14 |
| 4,796,085 | 1/1989 | Shinada | 358/14 |

Primary Examiner—Howard W. Britton
Assistant Examiner—Jeffrey S. Murrell
Attorney, Agent, or Firm—Alvin Sinderbrand; William S. Frommer

[57] ABSTRACT

Dropout is compensated in a video signal that has samples comprising respective different color information components in alternate lines and samples comprising luminance information time multiplexed with the color samples in each line. Adders (78, 82) average first and second sample (S1, S2) positioned one line after and one line before a central reference sample SR to produce a first averaged sample SA1, and third and fourth samples (S3, S4) positioned two lines after and two lines before the sample SR to produce a second averaged sample SA2. Gating means (48 to 60) outputs any one of the sample SR, the averaged samples and the first to fourth samples. An error detector (42) is responsive to error information ER for the sample SR indicating no dropout to cause the sampe SR to be output, and is responsive to the error information ER indicating dropout, and to timing information indicating whether the sample SR comprises color or luminance, to effect dropout compensation by causing another sample to be output in place of the sample SR in accordance with the algorithm set forth below, in which En represents the error information for the (n)th sample, En=0 means that there is no dropout for the (n)th sample, S=Y means that the sample SR comprises luminance, and S=C means that the sample SR comprises color:

(1) if S=Y go to (2) or if S=C go to (5);
(2) if E1=E2=0 output first averaged sample (SA1);
(3) Else if E1=0 output first sample (S1);
(4) Else if E2=0 output second sample (S2);
(5) Else if E3=E4=0 output second averaged sample (SA2);
(6) Else output fourth sample (S4).

18 Claims, 3 Drawing Sheets

METHOD AND APPARATUS FOR VIDEO SIGNAL DROPOUT COMPENSATION

BACKGROUND OF THE INVENTION

Field of the Invention

This invention relates to video signal dropout compensation.

For many years, color television (T) signals have been transmitted using the NTSC, PAL and SECAM color systems. Due to the huge amounts of monochrome equipment in existence when these three systems were initially contemplated, economic and bandwidth considerations imposed a large restraint on their designs. Specifically, the systems had to be compatible with existing monochrome systems in that they had to transmit their signals over existing channels and in that their signals could be received in (monochrome) on existing monochrome receivers as well as being received (in color) on color receivers. As a result, the systems were so designed that the chrominance (color) information was transmitted within the same frequency band as the luminance information, the chrominance and luminance information or signals being combined to form a so-called composite signal. This is possible by virtue of the fact that, by modulating the chrominance information onto a color sub-carrier of a precisely controlled frequency, it is possible to interleave the frequency spectra of the chrominance and luminance signals so that they suffer minimal interference (cross-talk) with one another. In practice, a certain amount of cross-talk (cross-color) and (cross-luminance) does in fact occur, at least in some circumstances.

In more recent times, with the advent of direct broadcast by satellite (DBS) systems, which are not subject to the constraint of having to be sent by existing (terrestrial) channels, the MAC (multiplexed analog components) system was designed. There are several variants of the MAC system, including normal definition MAC, widescreen MAC, high definition MAC, B-MAC, C-MAC, D-MAC, D2-MAC, and so on. All of the variants are characterized by the fact that, instead of being sent in composite form, the chrominance and luminance signals are sent sequentially, that is on a time division multiplex basis, so that they cannot interfere with each other. Thus, cross-color and cross-luminance cannot occur.

A full description of the MAC system can be obtained from various published documents, including the following specification published by the European Broadcasting Union (EBU): "Specification of the systems of the MAC/packet family—Tech 3258-E", EBU Technical Centre, Brussels, October 1986. For present purposes, the relevant features of the MAC system are as follows. Each line (that is, each line scanning interval) of the transmitted signal includes time-compressed chrominance information and time-compressed luminance information, the chrominance and luminance information being sent one after the other. In similar manner to existing systems, the chrominance information comprises two color difference signals. However, the two color difference signals are not both sent during each line. Rather, to reduce transmission bandwidth, the respective two color difference signals are sent on a line sequential basis, that is during alternate lines. Thus, odd-numbered lines of a frame will contain one of the color difference signals and even-numbered lines of the frame will contain the other of the color difference signals. However, since the number of lines per frame is odd, for example 625 for normal definition MAC, to simplify the design of equipment used in the system the sequence of the color difference signals is reset between frames so that each of the color difference signals is always sent during lines of the same number of successive frames. That is, the (n)th line of each successive frame will always include one of the color difference signals and the (n+1)th line of each successive frame will always include the other of the color difference signals.

At present, with the MAC system being fairly new, most studio equipment for use in MAC studios is of a conventional type, the signal being put into MAC format immediately before transmission. However, as the use of MAC systems becomes more extensive, it is probable that studio equipment specially designed to encode or convert signals into MAC format and/or to handle signals in MAC format will become generally avaiable. In particular, to take one example, it is probable that video tape recorders (VTRs) that can store and reproduce a signal in MAC format will be widely used.

A well-known problem associated with VTRs is that of dropout, namely short intervals in which a signal reproduced from a VTR (or, more generally, a tape player) is lost, or so severely attenuated as effectively to be lost, due to tape or playback head defects. Techniques for compensating for (concealing) dropout in conventional color systems, by substituting other, similar video information for information lost due to dropout, are well established. However, due to the radically different way in which the color and luminance information is arranged in MAC signals, the known techniques are not readily adaptable for use in compensating for dropout in MAC systems or, more generally, in line sequential color systems.

OBJECTS AND SUMMARY OF THE INVENTION

An object of the invention is to provide a method of compensating for dropout in a line sequential color type video signal.

Another object of the invention is to provide a dropout compensator for a line sequential color type video signal.

A further object of the invention is to provide a method of and/or apparatus for compensating for dropout in a line sequential color type video signal, in which an adaptive selection between different prioritized compensation options is made automatically, depending upon the extent of dropout.

Yet another object of the invention is to provide a method of and/or apparatus for compensating for dropout in a line sequential color type video signal, in which there is no need to employ a form of architecture which is a compromise between the different compensation requirements for luminance and chrominance.

The invention provides a method of and/or apparatus for digitally compensating for dropout in a video signal that has samples comprising respective different color information components in alternate lines thereof and that has samples comprising luminance information time-multiplexed with the samples comprising color information in each line. The method comprises the steps of:

storing four lines of the video signal such that a reference sample and at least three other samples are available on a sample by sample basis, the three other samples being positioned one line away from the reference sample, two lines after the reference sample and two lines before the reference sample, respectively;

storing an error signal indicative of whether each stored sample of the video signal has been subjected to dropout such that error values for the reference sample and the other samples are available on a sample by sample basis; and examining the error value for the reference sample on a sample by sample basis and, if it indicates no dropout, outputting the reference sample whereby dropout compensation is not effected, whereas, if it indicates dropout, effecting dropout compensation by outputting another sample in place of the reference sample in accordance with the algorithm set forth below, in which $S=Y$ means that the reference sample comprises luminance information and $S=C$ means that the reference sample comprises color information:

(A) If $S=Y$ go to (B) or if $S=C$ go to (C);
(B) If the error value for the sample positioned one line away from the reference sample indicates no dropout, output the sample positioned one line away from the reference sample;
(C) Else if the error values for the two samples positioned, respectively, two lines after and two lines before the reference sample, both indicate no dropout, output an average of those two samples;
(D) Else output one of the two samples positioned, respectively, two lines after and two lines before the reference sample;

The above technique provides good dropout compensation for a line sequential color type video signal. The technique is adaptive: depending upon the error values, a choice between various different compensation options takes place on a sample by sample basis. Switching between the prioritized series of compensation options (B) through (D) for the case when compensation is required for a sample comprising luminance information, and the restricted prioritized series of compensation options (C) and (D) (a subset of the first-mentioned series) for the case when compensation is required for a sample comprising luminance information, is effected automatically: there is no need to use a form of architecture which is a compromise between the different compensation requirements for luminance and chrominance.

The invention also provides a method of and/or apparatus for digitally compensating for dropout in a video signal that has samples comprising respective different color information components in alternate lines thereof and that has samples comprising luminance information time-multiplexed with the samples comprising color information in each line. The method comprises the steps of:

storing four lines of the video signal such that a reference sample, a first sample positioned one line after the reference sample, a second sample positioned one line before the reference sample, a third sample positioned two lines after the reference sample and a fourth sample positioned two lines before the reference sample are available on a sample by sample basis;

storing an error signal indicative of whether each stored sample of the video signal has been subjected to dropout such that error values for the reference sample and the first to fourth samples are available on a sample by sample basis; and examining the error value for the reference sample on a sample by sample basis and, if it indicates no dropout, outputting the reference sample whereby dropout compensation is not effected, whereas, if it indicates dropout, effecting dropout compensation by outputting another sample in place of the reference sample in accordance with the algorithm set forth below, in which $E_n$ represents the error value for the (n)th sample, $E_n=0$ means that there is no dropout for the (n)th sample, $S=Y$ means that the reference sample comprises luminance information, and $S=C$ means that the reference sample comprises color information:

(1) If $S=Y$ go to (2) or if $S=C$ go to (5);
(2) If $E1=E2=0$ output an average of the first and second samples;
(3) Else if $E1=0$ output the first sample;
(4) Else if $E2=0$ output the second sample;
(5) Else if $E3=E4=0$ output an average of the third and fourth samples;
(6) Else if $E3=0$ output the third sample;
(7) Else output the fourth sample.

The above method provides optimal dropout compensation for a line sequential color type video signal. The method is adaptive: depending upon the error value, averages from samples in lines before and after the reference sample are used where possible for compensation and stepping to compensation from a single line takes place when necessary, all on a sample by sample basis. Switching between the prioritized series of compensation options (2) through (7) for the case when compensation is required for a sample comprising luminance information, and the restricted prioritized series of compensation options (5) through (7) (a subset of the first-mentioned series) for the case when compensation is required for a sample comprising chrominance information, is effected automatically: there is no need to use a form of architecture which is a compromise between the different compensation requirements for luminance and chrominance.

A preferred use of the invention is in apparatus (such as VTRs) for recording and/or reproducing signals in MAC format, through the invention is more generally useful in any application in which compensation for dropout is required in a video signal that has respective different color information components in alternate lines (line scanning intervals) thereof and that has luminance information time-multiplexed with the color information in each line.

BRIEF DESCRIPTION OF THE DRAWINGS

The above and other objects, features and advantages of the invention will be apparent from the following detailed description of illustrative embodiments thereof, which is to be read in conjunction with the accompanying drawings, in which.

DESCRIPTION OF THE PREFERRED EMBODIMENTS

As explained above, the various different versions of a MAC video signal are all characterized by the fact that, instead of being sent in composite form, the chrominance and luminance components are sent sequentially, that is on a time division multiplex basis, so that they cannot interfere with each other. Specifically, a MAC signal is formed by encoding (multiplexing together) a luminance signal Y and two color difference signals which, in similar manner to the components of a PAL signal, are based upon $B-Y$ and $R-Y$. The color difference signals as applied to an encoder for performing the encoding operation are referred to as Pb (the $B-Y$ signal scaled to 0.7 V peak to peak) and Pr (the $R-Y$ signal scaled to 0.7 V peak to peak).

Each line (that is, each line scanning interval) of the transmitted MAC signal includes time-compressed chrominance information and time-compressed luminance information, the chrominance and luminance information being sent one after the other. Specifically, one or the other of the color difference signals Pb and Pr is time compressed to occupy about the first one third of each line and the luminance signal Y is time compressed to occupy about the remaining two thirds of each line.

The two color difference signals Pb and Pr are not both sent during each line. Rather, to reduce transmission bandwidth, the respective two color difference signals Pb and Pr are sent on a line sequential basis, that is during alternate lines. Thus, odd-numbered lines of a frame will contain one of the color difference signals (for example the signal Pb) and even-numbered lines of the frame will contain the other of the color difference signals (for example the signal Pr). However, since the number of lines per frame is odd, for example 625 for low definition MAC, to simplify the design of equipment used in the system the sequence of the color difference signals Pb and Pr is reset between frames so that each one of the color difference signals is always sent during lines of the same number of successive frames. That is, the odd-numbered lines of successive frames will always include the same one of the color difference signals (for example the signal Pb) and the even-numbered lines of successive frames will always include the other of the color difference signals (for example the signal Pr).

Figure 1:
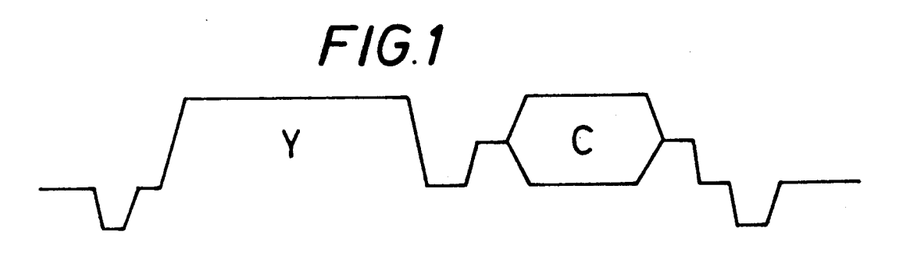
FIG. 1 is a waveform diagram of a MAC-type video signal, showing one line (horizontal scanning interval) thereof.
Figure 2:
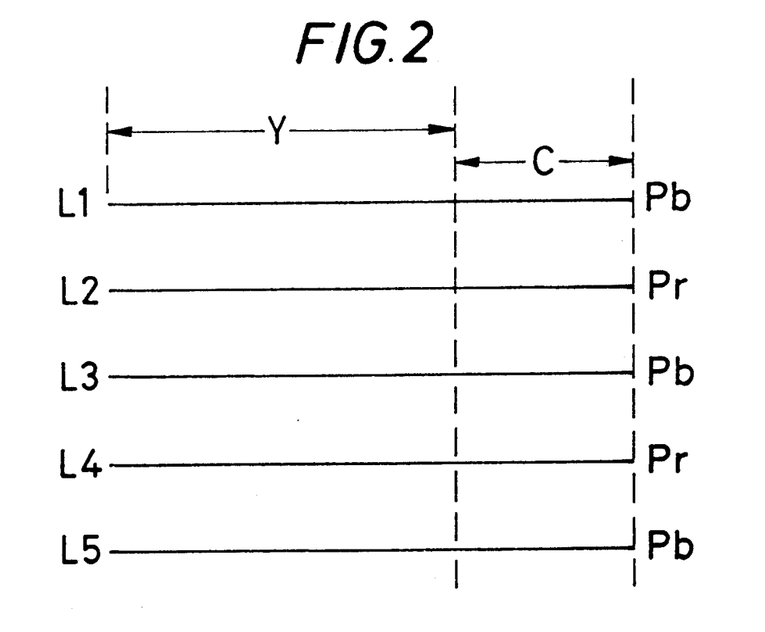
FIG. 2 shows several successive lines of the signal.

The above-described nature of a MAC signal can more readily be appreciated from an inspection of FIGS. 1 and 2, which are, respectively, a waveform diagram showing one line (horizontal scanning interval) of a MAC-type signal and a representation of several successive lines L1 to L5 of such a signal. In the MAC signal as tranmitted, as explained above, one or the other of the color difference signals or components Pb and Pr is time compressed to occupy about the first one third of each line and the luminance signal or information Y is time compressed to occupy about the remaining two thirds of each line. It will be seen that the signal as shown in FIGS. 1 and 2 differs therefrom in that the order of the color difference signals Pb and Pr and the luminance signal Y are interchanged in that the luminance signal comes first rather than second. This is because the signal as shown in FIGS. 1 and 2 is a signal used in a MAC VTR and the order of the parts of the signal in each line has been reversed because to have the luminance signal Y coming first leads to more stable operation of the VTR. However, the order in which the two parts of the video signal occur is not of relevance for present purposes. In particular, the order is irrelevant to the operation of a dropout compensator embodying the invention, as described below, since it is provided with timing information indicative of the timing of the two parts and is responsive thereto to perform different series of decision steps appropriate to whether it is presently compensating for dropout in color (chrominance) or luminance information, respectively.

It can be seen from inspecting FIGS. 1 and 2, in particular FIG. 2, that dropout compensation of a MAC-type signal presents a problem not encountered in the case of dropout compensation of conventional video signals. That is, due to the time-multiplexing together of the luminance and chrominance information in each line, the different parts of each line have to be compensated in respective different manners if optimal compensation is to be achieved. In general, dropout is best concealed if the substitute information comes from the closest possible line. Thus, taking the case of dropout occurring in, for example, the line L3, it is best for the substitute information to come from the adjacent line L2 or the adjacent line L4. While this is possible for the part of the line comprising the luminance signal Y, it is not possible for the part of the line containing the chrominance information C because each alternate line contains the chrominance information in the form of a respective one of the two color difference signals Pb and Pr, whereby substituting chrominance information from an adjacent line would lead to erroneous results. Thus, in the case of the part of the line L3 containing the chrominance information C, the closest possible lines from which valid substitute chrominance information can be obtained are the lines L1 and L5, because these are the closest lines which contain the same color difference signal (Pb) as the line L3.

On the face of it, therefore, one is faced with the necessity to solve the problem by way of a compromise, namely using a line two lines away from the current line to effect dropout compensation for the whole line (both luminance and chrominance parts), which inevitably will lead to less than optimal compensation.

However, a dropout compensator embodying the invention, now to be described with reference to FIGS. 3 and 4, avoids the need to make the above compromise.

Figure 3:
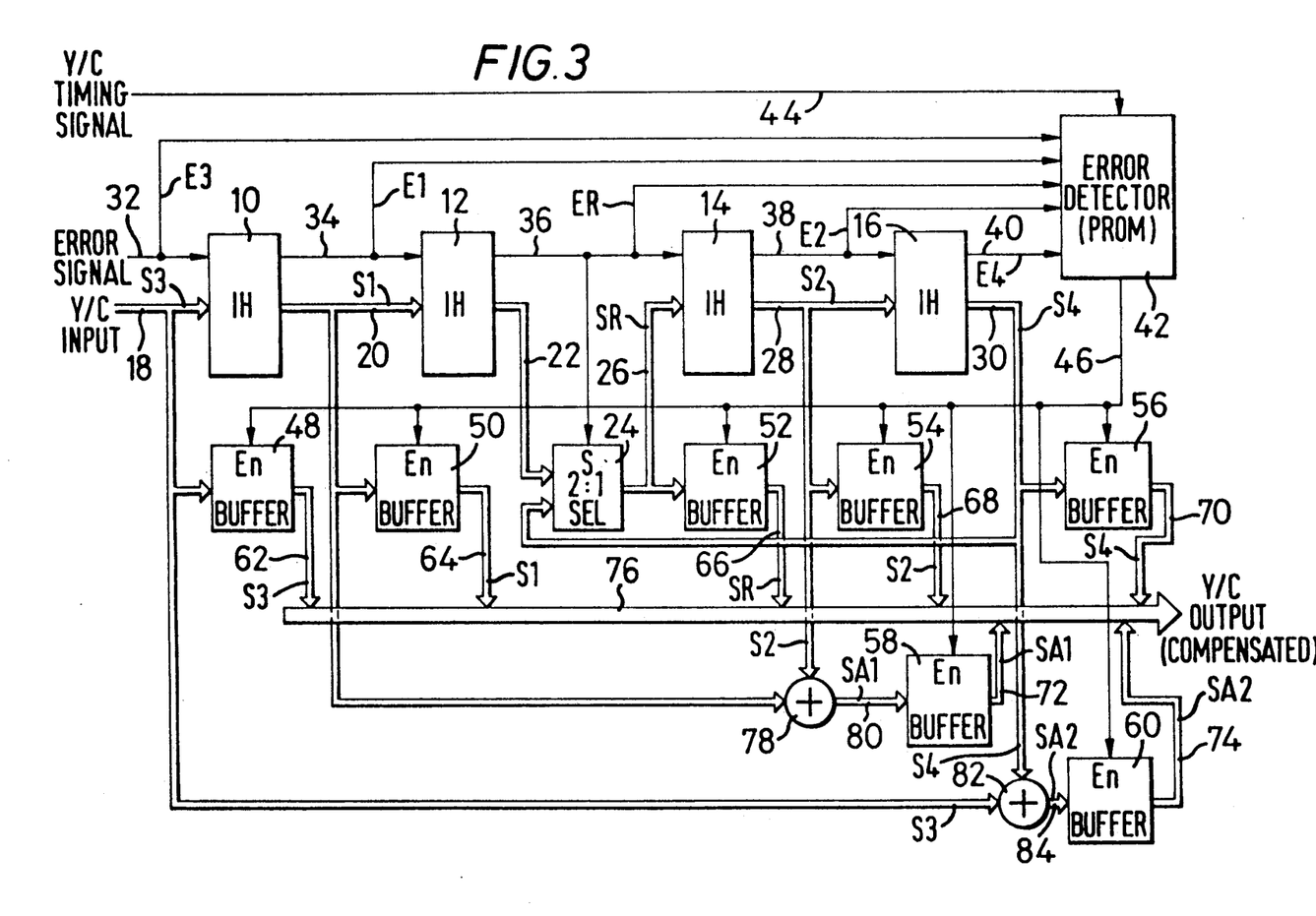
FIG. 3 is a schematic block diagram of a dropout compensator embodying the invention.
Figure 4:
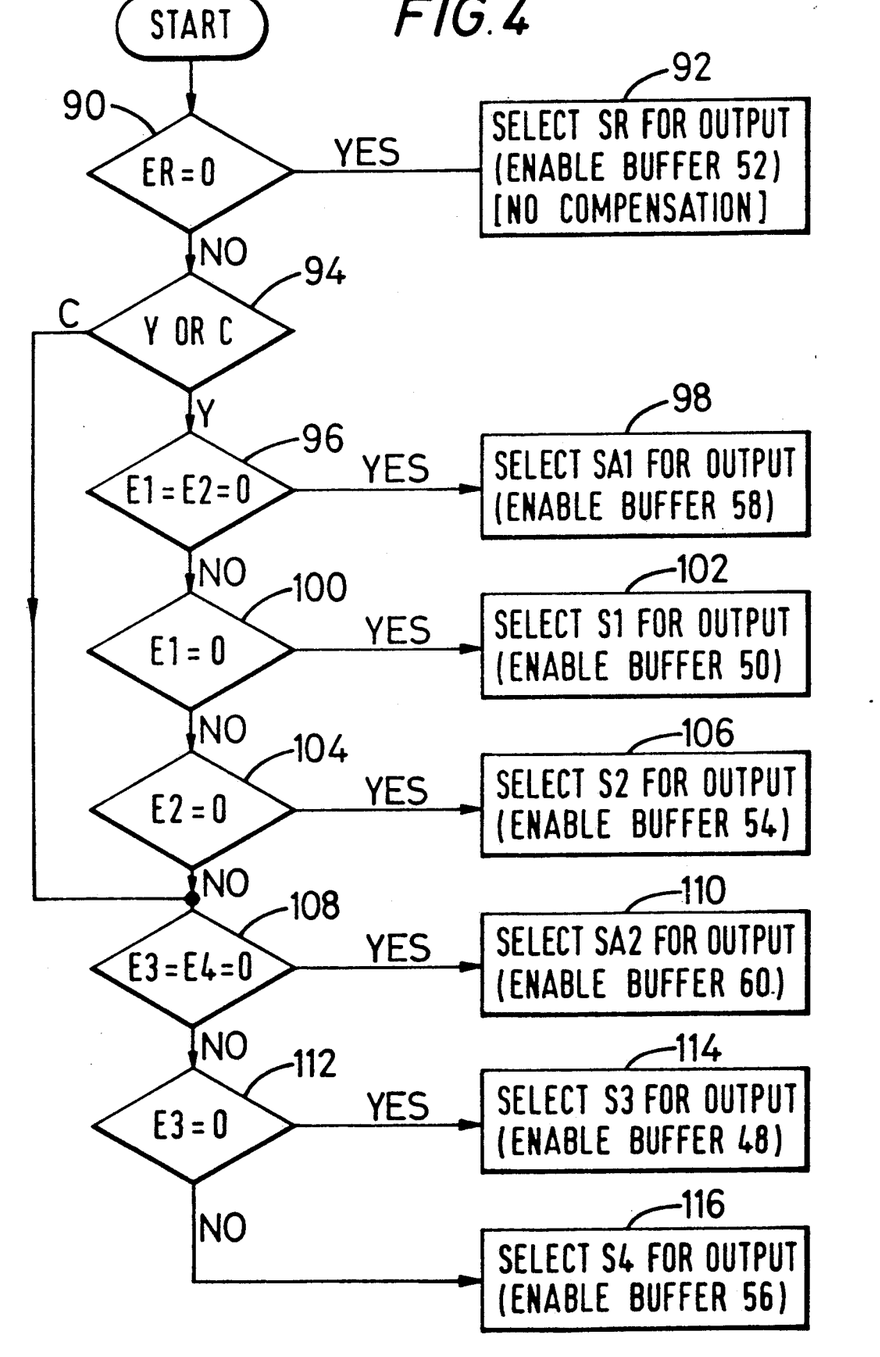
FIG. 4 is a flow diagram representing an algorithm (series of decisions) performed by the dropout compensator of FIG. 3 to decide how best to compensate for dropout.

The dropout compensator shown in FIG. 3 comprises a sample storage means and an error signal storage means both constituted by four storage (delay) elements 10, 12, 14 and 16. The elements 10, 12, 14 and 16 have respective sample storage portions which together constitute the sample storage means and respective error signal storage portions which together constitute the error signal storage means. An input video signal is applied to a bus 18 connected to an input of the sample storage portion of the storage element 10. The input signal is a digital version of the signal described with reference to FIGS. 1 and 2 and comprises a series of multi-bit words constituting samples, taken at a sampling rate or frequency fs, of the video signal. The capacity of the sample storage portion of each of the storage elements 10, 12, 14 and 16 is such as to enable it to store a number of samples (words) of the input signal making up one line (1H) of the input signal. That is, the sample storage portion of each of the storage elements 10, 12, 14 and 16 comprises a one line sample delay element.

An output of the sample storage portion of the storage element 10 is connected by a bus 20 to an input of the sample storage portion of the storage element 12. An output of the sample storage portion of the storage element 12 is connected by a bus 22 to a first input of a 2:1 selector 24. In normal operation of the dropout detector, that is when no dropout compensation is needed, the first input of the 2:1 selector 24 is connected to an output of the 2:1 selector, which output is connected by a bus 26 to an input of the sample storage portion of the storage element 14. An output of the sample storage portion of the storage element 14 is connected by a bus 28 to an input of the sample portion storage of the storage element 16. A bus 30 extends from an output of the sample storage portion of the storage element 16. A clock generator (not shown) is operative at the sampling frequency fs to clock the samples of the input signal through the sample storage portion of the storage elements 10, 12, 14 and 16 via the bus 18, the bus 20, the bus 22, the 2:1 selector 24, and the busses 26, 28 and 30. Thus, the storage elements 10, 12, 14 and 16 store, at any one clock period T (=1/fs), a number of consecutive samples of the input signal amounting to four lines thereof, the contents of the storage elements 10, 12, 14 and 16 stepping by one sample at each clock period, that is at the sample rate fs. The sample storage means constituted by the sample storage portions of the storage elements 10, 12, 14 and 16 is thus tapped at one line intervals, namely at the busses 18, 20, 22/26, 28 and 30.

A dropout detector (not shown), which may be of known form, monitors the input signal and generates an error signal indicative of whether each consecutive sample thereof has been subjected to dropout, more specifically whether the sample contains an error signifying that dropout has occurred. The error signal can thus comprise one bit for each sample of the input signal, the bit having a value E=0 if the corresponding sample has no error and a value E=1 if the corresponding sample has an error. The error signal is applied to a line 32 connected to another input of the storage element 10 which is connected to the error signal storage portion thereof. The error signal storage portion of each of the storage elements 10, 12, 14 and 16 stores the bits of the error signal for that line of samples of the video signal stored in the sample storage portion thereof. The portions of the storage elements 10, 12, 14 and 16 storing the error signal bits (one line bit delay elements) are interconnected by lines 34, 36 and 38 as shown whereby, in like manner to the way in which the samples are stored and stepped through the storage elements, the storage elements also store, at any one time, a number of consecutive bits of the error signal corresponding to the respective stored samples, the stored error bits being stepped by one bit at each clock period, that is at the sample rate fs, in synchronism with the stored samples to which they relate. That is, the portions of the storage elements 10, 12, 14 and 16 that constitute the error signal storage means storing the error signal bits corresponding to four lines of the input video signal are tapped at intervals of one line of the video signal (in like manner to the portions thereof storing the video signal samples), namely at the lines 32, 34, 36 and 38 and a line 40 connected to an output of the storage element 16.

The lines 32, 34, 36, 38 and 40 are connected to respective inputs of an error detector 42. Another input of the error detector 42 is connected via a line 44 to receive a Y/C timing signal which can, for example, be generated from the synchronizing signal for the input video signal. A bus 46 (shown as a line to avoid overcomplicating FIG. 3) connects an output of the error detector 42 to another input En of each of a plurality of buffers 48, 50, 52, 54, 56, 58 and 60 so as to selectively enable them, as described in detail below, to gate samples from the buffers, via respective associated busses 62, 64, 66, 68, 70, 72 and 74, to an output bus 76 of the dropout compensator which constitutes an output thereof. The buffers 48, 50, 52, 54, 56, 58 and 60 collectively act, in this regard, as gating means controlled by the error detector 42.

The line 36 extending between the error signal storage portions of the storage elements 12 and 14 is connected to a select input S of the 2:1 selector 24. The bus 30 leading from the sample storage portion of the storage element 16 is connected to a second input of the 2:1 selector 24. The bus 26 leading from the 2:1 selector 24 is connected to an input of the buffer 52 (as well as to the sample storage portion of the storage element 14).

Inputs of the buffers 48, 50, 54 and 56 are connected to the busses 18, 20, 28 and 30, respectively. The busses 20 and 28 are connected to respective inputs of a first averaging means in the form of a first adder 78, an output of which is connected by a bus 80 to an input of the buffer 58. The busses 18 and 30 are connected to respective inputs of a second averaging means in the form of a second adder 82, an output of which is connected by a bus 84 to an input of the buffer 60.

The bus 26 is the central tap of the portions of the storage elements 10, 12, 14 and 16 storing the video signal samples. The sample SR present at any one clock period on the bus 26 is thus disposed centrally of the samples stored by the storage elements 10, 12, 14 and 16; and is referred to hereinafter as the reference sample. First and second samples S1 and S2 present at any one clock period on the busses 20 and 28 (intermediate taps), respectively, are positioned one line after and one line before the reference sample SR. Third and fourth samples S3 and S4 present at any one clock period on the busses 18 and 30 (first and final taps), respectively, are positioned two lines after and two lines before the reference sample SR. The error signal values for the samples SR, S1, S2, S3 and S4 are designated ER, E1, E2, E3 and E4, respectively, and are present on the lines 36, 34, 38, 32 and 40, respectively.

The first adder 78 averages the samples S1 and S2 to produce a first averaged sample SA1. The second adder 82 averages the samples S3 and S4 to produce a second averaged sample SA2.

The operation of the dropout compensator depicted in FIG. 3 will now be described. Every clock period, that is on a sample by sample basis, the error detector 42 examines the error value ER on the line 36 and, if appropriate (see below), the error signal values E1, E2, E3 and E4 on the lines 34, 38, 32 and 40. To this end, the error detector 42 comprises logic circuitry (conveniently implemented in the form of a programmable read only memory (PROM) that performs the logic functions described below.

If the error signal value ER for the reference sample SR is such (ER=0) as to indicate that the sample SR has not been subjected to dropout, the error detector 42 enables the buffer 52. The 2:1 selector 24 is responsive to the value ER being equal to zero to connect the bus 22 to the bus 26. Consequently, the reference sample SR is passed via the bus 66 to the output bus 76 to form an output sample from the dropout compensator. Dropout compensation is not effected since no dropout has been detected. While no dropout is detected, the dropout compensator continues to operate in the above manner at every clock period.

When the error signal value for a particular clock period for the reference sample SR is such (ER=1) as to indicate that the sample SR has been subjected to dropout, compensation is effected by the error detector 42 causing the buffers 48, 50, 52, 54, 56, 58 and 60 to gate another sample to the output bus 76 in place of the sample SR. The error detector 42 attempts to optimize the compensation by selecting between several possible samples to be gated to the output bus 76 in accordance with the extent and positioning of the dropout as determined by the various error signal values E1 to E4 applied to its inputs, and by varying the compensatory action, if appropriate, in accordance with whether the sample SR for which compensation is to be effected comprises chrominance or luminance information. More specifically, a selected one of the samples S1, S2, S3, S4, SA1 and SA2 is gated to the output bus 76 in place of the sample SR. To this end, the error detector 42 operates in accordance with an algorithm which will now be described with reference to FIG. 4.

At the start of the operation performed at each clock period, the error detector 42 checks, as mentioned above, whether ER=0: see decision step 90 in FIG. 4. If the answer is YES, the buffer 52 is enabled whereby, as mentioned above, the sample SR is passed to the output bus 76, no dropout compensation being effected: see block 92 in FIG. 4. If, on the other hand, the answer is NO, the error detector 42 determines, from the timing signal applied thereto, whether the sample SR contains luminance (Y) or chrominance (C) information: see decision step 94.

If the decision step 94 indicates that the sample SR contains luminance (Y) information, the error detector 42 is free to attempt compensation from an adjacent line or lines: refer to the above description of FIG. 2. In general, the best result will be obtained by averaging between the two adjacent lines, assuming that the samples in those two lines that are aligned vertically with the sample SR, namely the samples S1 and S2, are both free from error, that is they both do not suffer from dropout. Whether this is so is checked in decision step 96, which checks for the condition E1=E2=0. If this condition holds true, the buffer 58 is enabled whereby the first averaged sample SA1 is passed to the output bus 76 to substitute for the sample SR and thereby effect dropout compensation: see block 98.

If the condition E1=E2=0 does not hold true, the next best course is to compensate from that one of the adjacent lines that comes after the line containing the sample SR, that is from new (rather than old) video data. Therefore, in a decision step 100, a check is carried out to determine whether the first sample S1, namely the sample one line after the sample SR, suffers from dropout: that is, a check is carried out to determine whether E1=0. If this condition holds true, the buffer 50 is enabled whereby the first sample S1 is passed to the output bus 76 to substitute for the sample SR and thereby effect dropout compensation: see block 102.

If the condition E1=0 does not hold true, the next best course is to compensate from that one of the adjacent lines that comes before the line containing the sample SR. Therefore, in a decision step 104, a check is carried out to determine whether the second sample S2, namely the sample one line before the sample SR, suffers from dropout: that is, a check is carried out to determine whether E2=0. If this condition holds true, the buffer 54 is enabled whereby the second sample S2 is passed to the output bus 76 to substitute for the sample SR and thereby effect dropout compensation: see block 106.

If the condition E2=0 does not hold true, attempts to compensate from the two lines adjacent to the line containing the sample SR have to be abandoned. Instead, the lines occurring two lines before and two lines after the line containing the sample SR are employed for compensation.

It was explained above with reference to FIG. 2 why the lines positioned one line before and one line after the line containing a sample suffering from dropout cannot be used to compensate for a sample comprising chrominance information, whereas the lines positioned two lines before and two lines after the line containing the sample are suitable for this purpose. That is, the lines positioned two lines before and two lines after the line containing the sample SR are suitable for compensating for the sample SR whether it contains luminance or chrominance information. Therefore, if the decision step 94 indicates that the sample SR contains chrominance (C) information, the procedure loops to downstream of the step 104, since the subsequent decisions all result in the supply to the output bus 76 of a sample based on one or both of the lines positioned two lines before and two lines after the line containing the sample SR.

In general, the next best result will be obtained by averaging between the lines positioned two lines before and two lines after the line containing the sample SR, assuming that the samples in those two lines that are aligned vertically with the sample SR, namely the samples S3 and S4, are both free from error, that is they both do not suffer from dropout. Whether this is so is checked in a decision step 108, which checks for the condition E3=E4=0. If this condition holds true, the buffer 60 is enabled whereby the second averaged sample SA2 is passed to the output bus 76 to substitute for the sample SR and thereby effect dropout compensation: see block 110.

If the condition E3=E4=0 does not hold true, the next best course is to compensate from the line that comes two lines after the line containing the sample SR, that is from new (rather than old) video data. Therefore, in a decision step 112, a check is carried out to determine whether the third sample S3, namely the sample two lines after the sample SR, suffers from dropout: that is, a check is carried out to determine whether E3=0. If this condition holds true, the buffer 48 is enabled whereby the third sample S3 is passed to the output bus 76 to substitute for the sample SR and thereby effect dropout compensation: see block 114.

If the condition E3=0 does not hold true, the next best course is to compensate from the line that comes two lines before the line containing the sample SR. Thus, in this event, the buffer 56 is enabled whereby the fourth sample S4 is passed to the output bus 76 to substitute for the sample SR and thereby effect dropout compensation: see block 116.

The steps of the algorithm represented at 94 to 116 in FIG. 4 can be summarized as follows.

If En represents the error information for the (n)th sample, En=0 means that the error information for the (n)th sample indicates that there is no dropout for the (n)th sample. S=Y means that the reference sample SR comprises luminance information. and S=C means that the reference sample SR comprises color information, the algorithm is given by:

(1) If S=Y go to (2) or if S=C go to (5);
(2) If E1=E2=0 supply first averaged sample SA1 to output bus 76;
(3) Else if E1=0 supply first sample S1 to output bus 76;
(4) Else if E2=0 supply second sample S2 to output bus 76;
(5) Else if E3=E4=0 supply second averaged sample SA2 to output bus 76;
(6) Else if E3=0 supply third sample S3 to output bus 76;
(7) Else supply fourth sample S4 to output bus 76.

A further feature of the dropout compensator illustrated in FIG. 3 is that, whenever the condition ER=1 is established during a clock period, that is, whenever it is decided that the sample SR has been subjected to dropout, the 2:1 selector 24 is responsive to the change in level on the line 36 to switch the bus 30 (rather than the bus 22) to the bus 26. As a consequence, the sample storage means constituted by the portions of the storage elements 10, 12, 14 and 16 that hold the video signal samples is interrupted at its central tap, that is at the location of the reference sample SR, and the sample S4 on the bus 30 (final tap) is recirculated into the sample storage means downstream of the point of interruption. Therefore, for as long as the condition ER=1 remains established the two lines of samples stored in the storage elements 14 and 16 (which in the absence of a recent massive dropout can be considered largely or wholly error-free samples) are recirculated via the busses 26, 28 and 30. Thus, the possibility of the samples (from previous lines) in the storage elements 14 and 16 becoming erroneous samples, due to erroneous samples being fed into them in the event of the dropout lasting for a long time, is avoided. That is, two lines of samples that will remain useful for some while to effect dropout compensation are safeguarded by recursion until the dropout has stopped, to cater for the possibility that the dropout will be of large duration.

As will be evident from the foregoing disclosure, the embodiment of the invention described above provides optimal dropout compensation for a line sequential color type video signal. The technique employed is adaptive: line averages are used where possible for compensation and an ordered transition to compensation on the basis of single lines takes place when necessary on a pixel by pixel (sample by sample) basis. (Further, recursive operation is switched in as described above in the event of compensation being necessary). Switching between the prioritized series of compensation options for the case when compensation is required for a sample comprising luminance information, and the restricted prioritized series of compensation options (a subset of the first-mentioned series) for the case when compensation is required for a sample comprising chrominance information, is effected automatically: there is no need to use a form of architecture which is a compromise between the compensation requirements for luminance and chrominance.

The above-described embodiment can be modified within the scope of the present invention by selecting a subset (rather than all) of the compensation options constituted by items (steps) (2) to (7) of the algorithm as detailed above. For example: the first averaged sample SA1 need not be formed (whereby option (2) is not provided); and/or either option (3) or option (4) may be eliminated, that is only one option for providing a substitute sample (S1 or S2) spaced one line away from the reference sample may be made available; and/or either option (6) or option (7) may be eliminated, that is only one option for providing a substitute sample (S3 or S4) spaced two lines away from the reference sample may be made available. Thus, if, for instance, all three of the foregoing simplifications are made, the algorithm reduces to:

(A) If S=Y go to (B) or if S=C go to (C);
(B) If E2=0(or if E1=0) supply sample S2 (or sample S1) to output bus 76;
(C) Else if E3=E4=0 supply averaged sample SA2 to output bus 76;
(D) Else supply sample S4 (or sample S3) to output bus 76.

The present invention is applicable to any of the different versions of the MAC system, for example ordinary definition MAC, widescreen MAC, high definition MAC, B-MAC, D-MAC, D2-MAC and so on. The invention should also be applicable to any future type of MAC system or to any derivation of the MAC system characterized in that the chrominance information is divided into plural signals which are sent on a line sequential basis.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of digitally compensating for dropout in a video signal including samples comprising respective different color information components in alternate lines thereof and samples comprising luminance information in each line thereof time-multiplexed with the samples comprising color information, the method comprising:

storing at least four lines of said video signal such that a reference sample and at least three other samples are provided on a sample by sample basis, a first sample of said at least three other samples being positioned one line away from said reference sample, a second sample of said at least three other samples being positioned two lines after said reference sample and a third sample of said at least three other samples being positioned two lines before said reference sample, respectively;

storing an error signal indicating whether each of said reference sample and said at least three other samples has been subjected to dropout such that respective error values for said reference sample and said at least three other samples are available on a sample by sample basis; and examining the respective error value for said reference sample on a sample by sample basis and, if it indicates no dropout, outputting said reference sample whereby dropout compensation is not effected, whereas, if it indicates dropout, effecting dropout compensation by outputting another sample in place of said reference sample as follows:

for a reference sample comprising luminance information, (i) outputting the first sample as said another sample at least on the condition that the respective error value for said first sample indicates no dropout thereof;

(ii) if the condition for outputting the first sample as said another sample is not fulfilled, outputting an average of the second and third samples as said another sample at least on the condition that the respective error values of the second and third samples indicate no dropout of either thereof, and (iii) if at least the conditions for outputting at least one of the first sample and the average of the second and third sample are not fulfilled, outputting one of said second and third samples as said another sample; and for a reference sample comprising color information, (i) outputting an average of the second and third samples as said another sample at least on the condition that the respective error values thereof indicate no dropout of either the second sample or the third sample, and (ii) if at least the condition for outputting the average of the second and third samples as said another sample is not fulfilled, outputting one of the second and third samples as said another sample.

2. A method according to claim 1, wherein the step of providing said first sample comprises providing said first sample positioned one line after said reference sample.

3. A method according to claim 2, further comprising the step of providing a fourth sample positioned one line before said reference sample as one of said at least three other samples, and wherein the step of effecting dropout compensation for a reference sample comprising luminance information where the respective error value for the first sample indicates a dropout thereof, comprises providing said fourth sample as said another sample at least on the condition that the respective error value of said fourth sample indicates no dropout thereof.

4. A method according to claim 1, further comprising the steps of providing a fourth sample positioned one line away from said reference sample on a side thereof opposite said first sample as one of said at least three other samples, and wherein the step of effecting dropout compensation for a reference sample comprising luminance information comprises outputting an average of the first and fourth samples as said another sample at least on the condition that the error values of the first and fourth samples indicate no dropouts thereof.

5. A method according to claim 1, wherein the step of outputting one of said second and third samples as said another sample comprises outputting said second sample as said another sample.

6. A method according to claim 5, wherein the step of effecting dropout compensation for a reference sample at least where the conditions for outputting at least one of said first sample, said average of the second and third samples and said second sample have not been fulfilled, comprises outputting said third sample as said another sample.

7. A method according to claim 1, further comprising the step of storing said third sample as another sample preceding a corresponding reference sample whose respective error value indicates a dropout thereof.

8. A method of digitally compensating for dropout in a video signal including samples comprising respective different color information components in alternate lines thereof and samples comprising luminance information in each line thereof time-multiplexed with said samples comprising color information, the method comprising:

storing four lines of said video signal such that a reference sample, a first sample positioned one line after said reference sample, a second sample positioned one line before said reference sample, a third sample positioned two lines after said reference sample and a fouth sample positioned two lines before said reference sample are provided on a sample by sample basis;

storing an error signal indicative of whether each of said reference sample and the first through fourth samples has been subjected to dropout such that respective error values for said reference sample and said first through fourth samples are provided on a sample by sample basis; and examining the respective error value for said reference sample on a sample by sample basis and, if it indicates no dropout, outputting said reference sample whereby dropout compensation is not effected, whereas, if it indicates dropout, effecting dropout compensation by outputting another sample in place of said reference sample as follows:

for a reference sample comprising luminance information, (i) outputting an average of the first and second samples as said another sample at least on the condition that the respective error values for said first and second samples indicate no dropout of either thereof, (ii) if the condition for outputting the average of the first second samples as said another sample is not fulfilled, outputting the first sample as said another sample at least on the condition that the respective error value for said first sample indicates no dropout thereof, (iii) if the conditions for outputting at least one of the average of the first and second samples and the first sample as said another sample are not fulfilled, outputting the second sample as said another sample at least on the condition that the respective error value for said second sample indicates no dropout thereof, (iv) if the conditions for outputting at least one of the average of the first and second samples, the first sample and the second sample as said another sample are not fulfilled, outputting an average of the third and fourth samples as said another sample at least on the condition that the respective error values of the third and fourth samples indicate no dropout of either thereof, (v) if the conditions for outputting at least one of the average of the first and second samples, the first sample, the second sample and the average of the third and fourth samples as said another sample are not fulfilled, outputting said third sample as said another sample at least on the condition that the respective error value of said third sample indicates no dropout thereof, and (vi) if at least the conditions for outputting at least one of the average of the first and second samples, the first sample, the second sample, the average of the third and fourth samples and the third sample as said another sample are not fulfilled, outputting said fourth sample as said another sample, and for a reference sample comprising color information, (i) outputting an average of the third and fourth samples as said another sample on the condition that the respective error values for said third and fourth samples do not indicate a dropout for either thereof, (ii) if the condition for outputting the average of the third and fourth samples as said another sample is not fulfilled, outputting said third sample as said another sample at least on the condition that the respective error value for said third sample indicates no dropout thereof, and (iii) if at least the conditions for outputting at least one of the average of the third and fourth samples and the third sample as said another sample are not fulfilled, outputting the fourth sample as said another sample.

9. A method according to claim 8, further comprising the step of storing said fourth sample as another sample preceding a corresponding reference sample whose respective error value indicates a dropout thereof.

10. A dropout compensator for a video signal including samples comprising respective different color information components in alternate lines thereof and samples comprising luminance information in each line thereof time-multiplexed with said samples comprising color information, the dropout compensator comprising:

sample storage means for storing at least four lines of said video signal, said sample storage means being operative to provide a reference sample and at least three other samples on a sample by sample basis, said at least three other samples including a first sample positioned one line away from said reference sample, a second sample positioned two lines after said reference sample and a third sample positioned two lines before said reference sample, respectively;

error signal storage means for storing respective error values indicating whether each sample of said video signal has been subjected to dropout, said error signal storage means being operative to store said respective error values corresponding to at least four lines of said video signal and being operative to provide said respective error values for said reference sample and said at least three other samples on a sample by sample basis;

means for producing an average of the second and third samples to produce a first averaged sample;

gating means for outputting, on a sample by sample basis, a selected one of said reference sample, said at least three other samples and said first averaged sample; and error detecting means for examining the respective error value for said reference sample on a sample by sample basis, said error detecting means being further operative to control said gating means to output said reference sample if the respective error value thereof indicates no dropout thereof whereby dropout compensation is not effected, and if the respective error value therefor indicates a dropout, to effect dropout compensation by controlling said gating means to output another sample in place of said reference sample as follows:

for a reference sample comprising luminance information, said error detecting means being operative to control said gating means (a) to output the first sample as said another sample at least on the condition that the respective error value for said first sample indicates no dropout thereof, and (b) if the condition for outputting the first sample as said another sample is not fulfilled, to output said first averaged sampled as said another sample at least on the condition that the respective error values of the second and third samples indicate no dropout of either thereof, and (c) if at least the conditions for outputting at least one of the first sample and the first averaged sample as said another sampled are not fulfilled, to output one of said second sample and said third sample as said another sample, and for a reference sample comprising color information, said error detecting means being operative to control said gating means (a) to output said first averaged sample as said another sample on the condition that the respective error values of the second and third samples indicate no dropout of either thereof, and (b) if at least the condition for outputting the first averaged sample as said another sample is not fulfilled, to output one of said second sample and said third sample as said another sample.

11. A dropout compensator according to claim 10, wherein said sample storage means is operative to provide said first sample positioned one line after said reference sample.

12. A dropout compensator according to claim 11, wherein said sample storage means is further operative to provide a fourth sample positioned one line before said reference sample, and said geting means being further operative to selectively output said fourth sample said error detecting means being further operative to control said gating means to output said fourth sample as said another sample in place of a said reference sample comprising luminance information whose respective error value indicates a dropout thereof at least on the condition that the respective error value of said fourth sample indicates no dropout thereof while the condition for outputting the first sample as said another sample is not fulfilled.

13. A dropout compensator according to claim 11, wherein said sample storage means is further operative to provide a fourth sample positioned one line before said reference sample, said dropout compensator further comprising means for producing an average of the first and fourth samples to produce a second averaged sample, wherein said gating means is further operative to selectively output said second averaged sample, and wherein said error detecting means is further operative to control said gating means to output said second averaged sample in place of a said reference sample comprising luminance information whose respective error value indicates a dropout thereof at least on the condition that the respective error values for said first and fourth samples indicate that neither is subject to dropout, 14. A dropout compensator according to claim 10, wherein said error detecting means is operative to control said gating means to output said second sample as said one of said second sample and said third sample.

15. A dropout compensator according to claim 14, wherein said error detecting means is further operative to control the gating means to output said third sample as said another sample in place of a said reference sample whose respective error value indicates a dropout thereof provided that at least the conditions for outputting at least one of said first sample, said first averaged sample, and said second sample are not fulfilled.

16. A dropout compensator according to claim 10, including selector means responsive, on a sample by sample basis, to said respective error value for said reference sample indicating dropout to control said sample storage means to store said third sample as another sample preceding a corresponding reference sample whose respective error value indicates a dropout thereof.

17. A dropout compensator for a video signal including samples comprising respective different color information components in alternate lines thereof and samples comprising luminance information in each line thereof time-multiplexed with said samples comprising color information, the dropout compensator comprising:

sample storage means for storing at least four lines of said video signal, said sample storage means being operative to provide a reference sample, a first sample positioned one line after said reference sample, a second sample positioned one line before said reference sample, a third sample positioned two lines after said reference sample and a fourth sample positioned two lines before said reference sample on a sample by sample basis;

error signal storage means for storing respective error values indicative of whether each sample of said video signal has been subjected to dropout, said error signal storage means being operative to store said respective error values corresponding to at least four lines of said video signal and being operative to provide said respective error values for said reference sample and the first through fourth samples on a sample by sample basis;

means for averaging said first and second samples to produce a first averaged sample and for averaging said third and fourth samples to produce a second averaged sample;

gating means for outputting, on a sample by sample basis, a selected one of said reference sample, the first and second averaged samples and said first through fourth samples; and error detecting means for examining the respective error value for said reference sample on a sample by sample basis, said error detecting means being further operative to control said gating means to output said reference sample if the respective error value therefor indicates no dropout thereof whereby dropout compensation is not effected, and being responsive to said reference sample error value indicating dropout to effect dropout compensation by causing said gating means to output another sample in place of said reference sample as follows:

for a reference sample comprising luminance information, said error detecting means being operative to control said gating means (a) to output the first averaged sample as said another sample at least on the condition that the respective error values for said first and second samples indicate no dropout of either thereof, (b) if the condition for outputting the first averaged sample as said another sample is not fulfilled, to output the first sample as said another sample at least on the condition that the respective error value for said first sample indicates no dropout thereof (c) if the conditions for outputting at least one of the first averaged sample and the first sample as said another sample are not fulfilled, to output the second sample as said another sample at least on the condition that the respective error value for said second sample indicates no dropout thereof, (d) if the conditions for outputting at least one of the first averaged sample, the first sample, and the second sample as said another sample are not fulfilled, to output said second averaged sample as said another sample at least on the condition that the respective error values of the third and fourth samples indicate no dropout of either thereof, (e) if the conditions for outputting at least one of the first averaged sample, the first sample, the second sample and the second averaged sample as said another sample are not fulfilled, to output said third sample as said another sample at least on the condition that the respective error value for said third sample indicates no dropout thereof, and (f) if at least the conditions for outputting at least one of the first averaged sample, the first sample, the second sample, the second averaged sample, and the third sample as said another sample are not fulfilled, to output said fourth sample as said another sample, and for a reference sample comprising color information, said error detecting means being operative to control said gating means (a) to output the second averaged sample as said another sample at least on the condition that the respective error values of the third and fourth samples indicate no dropout of either thereof, (b) if the condition for outputting the second averaged sample as said another sample is not fulfilled, to output said third sample as said another sample at least on the condition that the respective errror value for said third sample indicates no dropout thereof, and (c) if at least the conditions for outputting at least one of the second averaged sample and the third sample as said another sample are not fulfilled, to output said fourth sample as said another sample.

18. A dropout compensator according to claim 17, including selector means responsive, on a sample by sample basis, to said respective error value for said reference sample indicating dropout to control said sample storage means to store said third sample as another sample preceding a corresponding reference sample whose respective error value indicates a dropout thereof.

* * * * *